(12) United States Patent
Takamori

(10) Patent No.: US 10,858,556 B2
(45) Date of Patent: *Dec. 8, 2020

(54) URETHANE ADHESIVE

(71) Applicant: Henkel AG & Co. KGaA, Duesseldorf (DE)

(72) Inventor: Ai Takamori, Osaka (JP)

(73) Assignee: Henkel AG & Co. KGaA, Duesseldorf (DE)

( * ) Notice: Subject to any disclaimer, the term of this patent is extended or adjusted under 35 U.S.C. 154(b) by 228 days.

This patent is subject to a terminal disclaimer.

(21) Appl. No.: 15/621,195

(22) Filed: Jun. 13, 2017

(65) Prior Publication Data

US 2017/0275511 A1 Sep. 28, 2017

Related U.S. Application Data

(63) Continuation of application No. PCT/JP2015/005866, filed on Nov. 26, 2015.

(30) Foreign Application Priority Data

Dec. 19, 2014 (JP) ................................. 2014-258033

(51) Int. Cl.
| | | |
|---|---|---|
| *C09J 175/04* | (2006.01) | |
| *C08G 18/10* | (2006.01) | |
| *C08K 5/11* | (2006.01) | |
| *C08G 18/42* | (2006.01) | |
| *C08G 18/48* | (2006.01) | |
| *C08G 18/12* | (2006.01) | |
| *C08G 18/36* | (2006.01) | |
| *C08G 18/76* | (2006.01) | |
| *C08G 18/79* | (2006.01) | |
| *C08G 18/44* | (2006.01) | |
| *C08G 18/50* | (2006.01) | |
| *C08K 5/00* | (2006.01) | |

(52) U.S. Cl.
CPC ............ *C09J 175/04* (2013.01); *C08G 18/10* (2013.01); *C08G 18/12* (2013.01); *C08G 18/36* (2013.01); *C08G 18/4238* (2013.01); *C08G 18/44* (2013.01); *C08G 18/4808* (2013.01); *C08G 18/4825* (2013.01); *C08G 18/4854* (2013.01); *C08G 18/5045* (2013.01); *C08G 18/7642* (2013.01); *C08G 18/792* (2013.01); *C08K 5/11* (2013.01); *C08G 2170/40* (2013.01); *C08K 5/005* (2013.01); *C08K 5/0016* (2013.01)

(58) Field of Classification Search
CPC .... C09J 175/04; C08G 18/4808; C08G 18/44; C08G 18/4825; C08G 18/4238; C08G 18/36; C08G 18/12; C08G 18/10; C08G 18/792; C08G 18/7642; C08G 18/5045; C08G 18/4854; C08G 2170/40; C08K 5/11; C08K 5/005; C08K 5/0016

See application file for complete search history.

(56) References Cited

U.S. PATENT DOCUMENTS

| 4,994,540 A | 2/1991 | Boerner et al. | |
|---|---|---|---|
| 7,060,750 B2 | 6/2006 | Jansen et al. | |
| 2003/0232956 A1* | 12/2003 | Brinkman | C08G 18/12 528/59 |
| 2004/0063869 A1* | 4/2004 | Minamida | C08G 18/12 525/452 |
| 2005/0288430 A1 | 12/2005 | Gindin et al. | |
| 2006/0079661 A1 | 4/2006 | Zhu et al. | |
| 2009/0242123 A1* | 10/2009 | Zhang | C08G 18/12 156/331.4 |

FOREIGN PATENT DOCUMENTS

| CN | 1690101 A | 11/2005 |
|---|---|---|
| CN | 1712423 A | 12/2005 |
| CN | 101089047 A | 12/2007 |
| EP | 1080126 B1 | 10/2003 |
| JP | H04211486 A | 8/1992 |
| JP | 2000328035 A | 11/2000 |
| JP | 2011190420 A | 9/2011 |

OTHER PUBLICATIONS

International Search Report for International PCT Patent Application No. PCT/JP2015/005866 dated Feb. 18, 2016.
Methyl ricinoleate, Handbook of Formulation and Process for Chemical Products, edited by Yanfu Guo, pp. 862-864, Jilin Science & Technology Publishing House, Feb. 1993.

\* cited by examiner

*Primary Examiner* — Rabon A Sergent
(74) *Attorney, Agent, or Firm* — James E. Piotrowski

(57) ABSTRACT

Disclosed is a urethane adhesive comprising a urethane resin obtained by blending a polyol with an isocyanate compound; a plasticizer; and a stabilizing agent, wherein the polyol comprises a polyether polyol, and the plasticizer comprises a castor oil based compound. Releasability of the adhesive does not degrade even though the adhesive is kept under a severe condition such as at a high temperature and at a high humidity, and the adhesive is excellent in compatibility with regard to the plasticizer and the stabilizing agent. Since the urethane adhesive is excellent in releasability with regard to a glass plate, a polarizer for liquid crystal displays and so on, it is useful as an adhesive for surface protective films which are used for windowpanes, mobile phones and the like.

9 Claims, No Drawings

URETHANE ADHESIVE

CROSS-REFERENCE TO RELATED APPLICATIONS

This application claims benefit under Paris Convention of Japanese Patent Application No. 2014-258033 filed on Dec. 19, 2014, incorporated herein by reference in its entirety.

TECHNICAL FIELD

The present invention relates to a urethane adhesive (or urethane pressure sensitive adhesive) applied to adhesive (or sticky) products such as adhesive tapes, self-adhesive films and self-adhesive labels, and particularly protective (or protection) films which cover windowpanes and displays for mobile phones, smart phones, tablets, TVs and the like.

BACKGROUND ART

Adhesives (or Pressure sensitive adhesives) are employed for tapes, seals, labels, decoration sheets, non-slip sheets and so on. Recently, they are also used on surface protective films for liquid crystal displays. Afterward, the surface protective films will be peeled off from adherends such as glass plates or polarizers for liquid crystal displays. Therefore, even though the protective films are attached for a long time, a person can peel off the protective films by his hand, that is, the adhesives should have excellent releasability (removability or detachability).

Acrylic resin based adhesives and rubber based adhesives are traditionally known as an adhesive (or pressure sensitive adhesive). However, the acrylic resin based adhesives may cause increase in adhesiveness and may generate adhesive deposit (that is, cohesive failure) on an adherend due to lack of cohesive force of an adhesive layer itself as time passes after attaching the adhesive product, when an adhesive product is peed off (or removed).

On the other hand, the rubber based adhesives generally comprise additives such as tackifier resins and plasticizers in large amounts. Therefore, as time passes after attaching an adhesive product, these additives may appear as a bleed. As a result, adhesiveness of the adhesives may decrease and an adhesive deposit may remain on an adherend on peeling off.

As one method for solving these problems, urethane adhesives may be used (please refer to Patent Documents 1 and 2).

Patent Document 1 discloses a pressure sensitive adhesive which is obtained by blending a composite resin comprising a copolymer of unsaturated monomers and a urethane resin with a multifunctional polyisocyanate compound (please refer to [claim 1], [0041]-[0054] and [0066]-[0067] of Patent Document 1).

Patent Document 2 discloses a urethane pressure sensitive adhesive which is obtained by mixing a polyurethane polyol, a multifunctional isocyanate compound and a fatty acid ester (please refer to [claim 1], [0046]-[0047] of Patent Document 2).

Compared to the acrylic based adhesives and the rubber based adhesives, the urethane pressure sensitive adhesives of Patent Documents 1 and 2 can inhibit segregation (separation or appearance) of a bleed and generation of an adhesive deposit, and can maintain a certain level of properties with regard to releasability after time passes for a long time. However, the urethane adhesives of both of Patent Documents do not have enough releasability when time passes under a condition at high temperature and/or at high humidity.

Moreover, when a urethane (pressure sensitive) adhesive is used for protective films of windowpanes, the urethane adhesive should comprise additives in a large amount, since the urethane adhesive easily turns yellow by ultraviolet light. As a result, the additives in a large amount may decrease compatibility of the adhesive, and bleed may appear.

CITATION LIST

Patent Literature

JP 2000-328035 A
JP 2011-190420 A

SUMMARY OF INVENTION

Technical Problem

An object of the present invention is to provide a urethane adhesive, wherein releasability of the adhesive does not degrade and the adhesive is excellent in compatibility, even though the adhesive is applied to a protective film and the adhesive is subjected under a severe condition such as at high temperature and at high humidity for a long time.

Solution to Problem

The present inventors intensively studied, and found that a urethane adhesive (or pressure sensitive adhesive) comprising a specific plasticizer and a urethane resin synthesized from a specific polyol can maintain its releasability under a severe condition, and even though a plasticizer and a stabilizing agent are added, each solubility of the components are preferable, and the present invention is completed.

That is, the present invention and preferable embodiments of the present invention are as follows:

In an aspect of the present invention, disclosed is a urethane adhesive comprising a urethane resin obtainable by blending a polyol with an isocyanate compound; a plasticizer; and a stabilizing agent, wherein the polyol comprises a polyether polyol, and the plasticizer comprises a castor oil based compound.

In an embodiment, the present invention provides a urethane adhesive, wherein a urethane resin is a urethane prepolymer obtained by adding an additional isocyanate compound to a urethane polyol which is obtained by mixing a polyol with an isocyanate.

In another embodiment, the present invention provides a urethane adhesive, wherein the polyol further comprises a polyester polyol.

In a preferable embodiment of the present invention, a urethane adhesive is provided, wherein the castor oil based compound has a viscosity of from 5 to 400 mPa·s at 25° C.

In a further embodiment, the present invention provides a urethane adhesive, wherein the stabilizing agent comprises a phenol based antioxidant.

In a further other embodiment, the present invention provides a urethane adhesive, wherein the isocyanate compound comprises at least one selected, from aliphatic isocyanates and alicyclic isocyanates.

In a further preferable embodiment, the present invention provides a two component (type) urethane adhesive, wherein a urethane polyol is combined with an additional isocyanate compound for obtaining the urethane adhesive.

In another aspect of the present invention, an adhesive film coated with the urethane adhesive as described above is provided.

In a preferable aspect, the present invention provides a member protected with the above mentioned adhesive film.

In a further aspect of the present invention, disclosed is a urethane polyol obtainable by blending a polyol with an isocyanate compound, wherein the urethane polyol comprises a plasticizer, wherein the polyol comprises a polyether polyol, and the plasticizer comprises a castor oil based compound.

In a preferable embodiment of the present invention, a urethane adhesive is provided, wherein the castor oil based compound has a viscosity of from 5 to 400 mPa·s at 25° C.

In a further preferable embodiment, the present invention provides a urethane polyol, wherein the urethane polyol further comprises a stabilizing agent.

Advantageous Effects of Invention

A urethane adhesive of an embodiment of the present invention comprises a urethane resin obtainable by blending a polyol with an isocyanate compound; a plasticizer; and a stabilizing agent, wherein the polyol comprises a polyether polyol, and the plasticizer comprises a castor oil based compound.

Releasability of the adhesive does not degrade even though the adhesive is maintained under a severe condition such as at high temperature and at high humidity, and since the adhesive is excellent in compatibility with a plasticizer and a stabilizing agent, no bleed appears.

Since a urethane adhesive of an embodiment of the present invention is excellent in releasability from a glass plate, a polarizer for liquid crystal displays and so on, the adhesive is useful for surface protective films of windowpanes and mobile phones.

DESCRIPTION OF EMBODIMENTS

A urethane adhesive of an embodiment of the present invention comprises a urethane resin obtainable by blending a polyol with an isocyanate compound; a plasticizer; and a stabilizing agent.

Urethane Resin

A urethane resin is a polymer obtainable by blending a polyol with an isocyanate compound and by reacting both the components, and has urethane bonds. The urethane resin may be a urethane prepolymer comprising excessive isocyanate groups, may be a urethane polyol comprising excessive hydroxyl groups, and can comprise below mentioned plasticizers, stabilizing agents and the other agents (or components).

Methods for mixing a polyol and an isocyanate compound are not particularly limited as long as the objects of the present invention are achieved.

Polyol

In an embodiment of the present invention, the polyol comprises a polyether polyol.

Known polyether polyols can be used as the polyether polyol. The polyether polyols can be obtained by polymerizing an oxirane compound such as ethylene oxide, propylene oxide, butylene oxide and tetrahydrofuran with a low molecular weight polyol such as water, propylene glycol, ethylene glycol, glycerine and tirmethylolpropane as an initiator.

Concretely, polyether polyols having two or more functional groups such as polypropylene glycols (PPG), polyethylene glycols (PEG), polytetramethylene glycols and the like may be used.

The polyether polyols preferably have a number average molecular weight of from 500 to 5,000 and particularly preferably have a number average molecular weight of from 800 to 4,000. When the polyether polyols have a number average molecular weight in the above range, the urethane adhesive of an embodiment of the present invention is excellent in compatibility and it would be difficult for bleed to appear.

The number average molecular weight (Mn) in the present specification means a value which is measured by gel permeation chromatography (GPC) and converted in terms of polystyrene standards. Specifically, the Mn can be obtained by the following GPC apparatus and measurement method. HCL-8220GPC manufactured by TOSOH CORPORATION is used as a GPC apparatus, and RI is used as a detector. Two TSKgel SuperMultipore HZ-M manufactured by TOSOH CORPORATION are used as a GPC column. A sample is dissolved in tetrahydrofuran, and the solution is allowed to flow at a flow rate of 0.35 ml/min and at a column temperature of 40° C. to obtain a measured value of a molecular weight. By a calibration curve using polystyrene having a monodispersed molecular weight as a standard substance, the measured molecular weight is converted to obtain the objective Mn.

The polyether polyol preferably has a hydroxyl value of from 30 to 200 mgKOH/g, particularly preferably has a hydroxyl value of from 50 to 150 mgKOH/g. When the polyether polyol has a hydroxyl value in the above range, the urethane adhesive of an embodiment of the present invention may be excellent in balance between cohesive force and adhesiveness, and as a result, may maintain releasability under a severe condition such as at high temperature and at high humidity.

In the present description, the hydroxyl value is a number of mg of potassium hydroxide required to neutralize acetic acid combined with hydroxyl groups when 1 g of a resin is acetylated.

In the present specification, the hydroxyl value is concretely calculated by the following equation (i).

Hydroxyl value=(Weight of low molecular weight polyol/Molecular weight of low molecular weight polyol)×Mole number of hydroxyl group contained in 1 mole of low molecular weight polyol×Formula weight of KOH×1000/Weight of polyether polyol    (i):

In an embodiment of the present invention, the polyol further preferably comprises a polyester polyol. When the polyol comprises a polyester polyol, the urethane adhesive of an embodiment of the present invention may be excellent in cohesive force.

In the present invention, the "polyester polyol" means a compound which belongs to "main chain type" polyesters and has ester bonds and hydroxyl groups in the "main chain". The polyester polyol is generally obtainable by a condensation polymerization reaction of a low molecular diol with a dicarboxylic acid and/or an anhydride thereof.

Examples of the dicarboxylic acid include oxalic acid, malonic acid, succinic acid, glutaric acid, adipic acid, pimelic acid, suberic acid, azelaic acid, sebacic acid , decanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, phthalic acid, terephthalic acid, isophthalic acid, naphthalenedicarboxylic acid, trimellitic acid, trimesic acid, cyclohexanedicarboxylic acid and the like. These dicarboxylic acids are used alone or in combination.

Examples of the carboxylic anhydrides contain acetic anhydride, propionic anhydride, succinic anhydride, maleic anhydride and phthalic anhydride. These can be used alone or in combination.

Diols having 1-3 functional groups are preferable as the low molecular weight diol. Examples of the "diol" include ethylene glycol, 1-methylethylene glycol, 1-ethylethylene glycol, propylene glycol, butanediol, pentanediol, hexanediol, heptanediol, octanediol, nonanediol, decanediol, neopentyl glycol, 2-methyl-1,3-propanediol, cyclohexanedimethanol, 2,4-dimethyl-1,5-pentanediol, 2,4-dibutyl-1,5-pentanediol and the like.

The polyesterpolyol preferably has a number average molecular weight of from 500 to 3,000, and particularly preferably has a number average molecular weight of from 1,000 to 2,500. When the polyesterpolyol has a number average molecular weight in the above range, the urethane adhesive of an embodiment of the present invention may be excellent in compatibility, and it would be difficult for bleed to generate. The number average molecular weight of the polyesterpolyol can be determined by GPC in a manner similar to the way the number average molecular weight of the polyetherpolyol is determined.

The polyesterpolyol preferably has a hydroxyl value of 30-200 mgKOH/g, particularly preferably has a hydroxyl value of 50-150 mgKOH/g. When the polyesterpolyol has a hydroxyl value in the above range, the urethane adhesive of an embodiment of the present invention may be excellent in balance between cohesive force and adhesiveness, and as a result, releasability may be maintained under a severe condition at high temperature and/or at high humidity.

The hydroxyl value of the polyester polyol is calculated by the below equation (ii).

Hydroxyl value=(Weight of low molecular weight diol/Molecular weight of low molecular weight diol)×Mole number of hydroxyl group contained in 1 mole of low molecular weight diol× Formula weight of KOH×1000/Weight of polyester polyol    (ii):

In an embodiment of the present invention, when a urethane adhesive is prepared, a polyol is preferably mixed with an isocyanate compound in a small amount to prepare a urethane polyol having a hydroxyl group at the end. And then the urethane polyol is further preferably mixed with an additional isocyanate compound to prepare a urethane prepolymer. The urethane polyol preferably comprises a plasticizer and a stabilizing agent mentioned below. The plasticizer and the stabilizing agent may be added on or after preparing the urethane polyol. The plasticizer comprises a castor oil based compound mentioned below.

The urethane prepolymer can be obtained by mixing the urethane polyol with the additional isocyanate compound, and has an isocyanate at the end. Moreover, the additional isocyanate compound may be the same as or may be different from the former isocyanate compound. The isocyanate group at the end reacts with water in the air, and then the urethane prepolymer has adhesiveness. The urethane adhesive of an embodiment of the present invention can comprise this urethane prepolymer. The urethane adhesive comprising the urethane prepolymer can be used as so-called a one-component adhesive.

On the other hand, the above urethane polyol and the additional isocyanate compound are maintained as one combination (or one pair), and they are mixed on use and the obtained mixture can be used as a urethane adhesive. The above urethane prepolymer can be generated by mixing the urethane polyol with the additional isocyanate compound. The combination (or pair) of the urethane polyol with the additional isocyanate compound may be used as so-called two-component adhesive. A plasticizer, a stabilizing agent and the other components may be initially added to the urethane polyol and/or the additional isocyanate compound or may be added on mixing them. A person skilled in the art can select suitably. The plasticizer is preferably added to the urethane polyol. Furthermore, the stabilizing agent can be added to the urethane polyol.

Further, when the urethane polyol is obtained from the polyol and the isocyanate compound in a small amount, ratio (NCO/OH) (molar ratio) of NCO groups of the isocyanate compound with OH groups of the polyol is preferably from 0.7 to 0.9.

In contrast, when the urethane prepolymer is prepared from the urethane polyol and the additional isocyanate compound, ratio (NCO/OH) (molar ratio) of NCO groups of the additional isocyanate compound with OH groups of the urethane polyol is preferably from 0.8 to 1.1. More suitable adhesive can be obtained by controlling the ratio (NCO/OH) (molar ratio) appropriately.

Isocyanate Compound

The isocyanate compound is not particularly limited as long as the objective urethane adhesive of an embodiment of the present invention can be obtained. The isocyanate compound preferably contains at least one selected from aliphatic isocyanates and alicyclic isocyanates. When the isocyanate compound comprises the above mentioned isocyanate, the urethane adhesive of an embodiment of the present invention may have good weatherability. Therefore, an amount of a stabilizing agent (such as an antioxidant and an ultraviolet absorber) may be decreased and compatibility may be improved.

The "isocyanate compound" of an embodiment of the present invention does not mean that it is composed of only the aliphatic isocyanate and the alicyclic isocyanate. As long as an adverse influence is not exerted on releasability and compatibility of the urethane adhesive of an embodiment of the present invention, the isocyanate compound may comprise an aromatic isocyanate. The isocyanate compound preferably comprises no ethylenic double bond (for example, ethylene group, butylene group and the like) from the viewpoint of weatherability.

In the present specification, the "aliphatic isocyanate" refers to a compound which has a chain-like hydrocarbon chain in which isocyanate groups are directly combined to the hydrocarbon chain, and also has no cyclic hydrocarbon chain. Although the "aliphatic isocyanate" may have an aromatic ring, the aromatic ring is not directly combined with the isocyanate groups.

In the present description, the aromatic ring is not included in the cyclic hydrocarbon chain.

The "alicyclic isocyanate" is a compound which has a cyclic hydrocarbon chain and may have a chain-like hydrocarbon chain. The isocyanate group may be either directly combined with the cyclic hydrocarbon chain, or may be directly combined with the chain-like hydrocarbon chain which may be present. Although the "alicyclic isocyanate" may include an aromatic ring, the aromatic ring is not directly combined to the isocyanate groups.

The "aromatic isocyanate" refers to a compound which has an aromatic ring, in which isocyanate groups are directly combined with the aromatic ring. Therefore, a compound, in which isocyanate groups are not directly combined with the aromatic ring, is classified into the aliphatic isocyanate or the alicyclic isocyanate even if it includes an aromatic ring in the molecule.

Therefore, for example, 4,4'-diphenylmethane diisocyanate (OCN—$C_6H_4$—$CH_2$—$C_6H_4$—NCO) corresponds to the aromatic isocyanate, since the isocyanate groups are directly combined with the aromatic ring. On the other hand, for example, xylylene diisocyanate (OCN—$CH_2$—$C_6H_4$—$CH_2$—NCO) corresponds to the aliphatic isocyanate since it includes an aromatic ring, but the isocyanate groups are not directly combined with the aromatic ring and combined with methylene groups.

The aromatic ring may be a ring in which two or more benzene rings are fused.

Examples of the aliphatic isocyanate include 1,4-diisocyanatobutane, 1,5-diisocyanatopentane, 1,6-diisocyanatohexane (hereinafter referred to as (hexamethylene diisocyanate (HDI)), 1,6-diisocyanato-2,2,4-trimethylhexane, 2,6-diisocyanatohexanoic acid methyl ester (lysine diisocyanate), 1,3-bis(isocyanatomethyl)benzene (xylylene diisocyanate (XDI)) and the like.

Examples of the alicyclic isocyanate include 5-isocyanato-1-isocyanatomethyl-1,3,3-trimethylcyclohexane (isophorone diisocyanate (IPDI)), 1,3-bis(isocyanatomethyl)cyclohexane (hydrogenated xylylene diisocyanate), bis(4-isocyanatocyclohexyl)methane (hydrogenated diphenylmethane diisocyanate), 1,4-diisocyanatocyclohexane and the like.

In the present invention, the isocyanate compound can comprise an aromatic isocyanate as long as the objective urethane adhesive can be obtained. Examples of the aromatic isocyanate include, 4,4'-diphenylmethane diisocyanate, p-phenylene diisocyanate, m-phenylene diisocyanate and the like.

These isocyanate compounds can be used alone or in combination. Particularly, HDI is preferable.

An additional isocyanate compound is preferably an adduct to the above mentioned isocyanate compound, more preferably an adduct of trimethylolpropane, and particularly preferably an adduct of trimethylolpropane to a diisocyanate. Examples of such adduct contain an adduct of trimethylolpropane to hexamethylene isocyanate.

When an adduct is used as an additional isocyanate compound, the adhesive may have improved cohesive force and may be more excellent in releasability.

Plasticizer

In the present specification, a plasticizer means a material which is added to a polymer composition and gives the polymer composition softness (or flexibility). In an embodiment of the present invention, the plasticizer comprises a castor oil based compound.

Examples of the castor oil based compound contain castor oils and castor oil based derivatives. When the plasticizer comprises a castor oil and/or a castor oil based derivative, a urethane adhesive of an embodiment of the present invention may be excellent in compatibility and may have excellent releasability under a severe condition such as at high temperature and at high humidity.

The castor oil is one kind of vegetable oils obtained from seeds of castor oil plants of Euphorbiaceae, and comprises glycerides of unsaturated fatty acids (ricinoleic acid: 87%, oleic acid: 7%, linoleic acid: 3%) and saturated fatty acids (palmitic acid, stearic acid and the like: 3%) in a small amount. Commercial products are available as a castor oil based compound. Examples of the commercial products of a castor oil contain LAV (trade name) produced by Itoh Oil Chemicals Co., Ltd.

In the present invention, a castor oil derivative means a compound which is obtained by modifying a castor oil (which is one kind of vegetable oils) with introduction of a functional group, oxidation, reduction, replacement of atoms and the like, while the chemical structure and properties of the castor oil are not changed significantly.

Examples of the castor oil derivative contain dehydrated castor oils, hydrogenated castor oils, castor oil fatty acids, dehydrated castor oil fatty acids, 12-hydroxystearic acid, castor oil fatty acid esters and the like.

Examples of commercial products of the castor oil derivative contain:

Hydrogenated Castor Oil A (trade name), CO-FA (trade name), DCO-FA (trade name), Ric Cizer S4 (trade name), Ric Cizer C-101 (trade name) and Ric Cizer GR-310 (trade name) produced by Itoh Oil Chemicals Co., Ltd;

Blaunon BR-410 (trade name), Blaunon BR-420 (trade name), Blaunon BR-430 (trade name), Blaunon BR-450 (trade name), Blaunon CW-10 (trade name), Blaunon RCW-20 (trade name), Blaunon RCW-40 (trade name), Blaunon RCW-50 (trade name), Blaunon RCW-60 (trade name) and the like produced by Aoki Oil Industrial Ltd; and Castor Wax A (trade name), Newcizer 51OR (trade name), Stearic acid Sakura (trade name), Hydrogenated Castor Oil Fatty Acid (trade name), NAA-34 (trade name), NAA-160 (trade name), NAA-175(trade name) and the like by NOF Corporation.

The castor oil based compounds can be used alone or in combination.

Acid value of the castor oil based compound of an embodiment of the present invention is preferably not more than 3.0 mgKOH/g, and is particularly preferably not more than 2.0 mgKOH/g. When the acid value is in the above range, the urethane adhesive may be excellent in compatibility and generation of bleed may be reduced.

On the assumption that all acid groups included in 1 g of the castor oil based compound are free acids, the "acid value" of the castor oil based compound is expressed by a calculated value of a number of milligrams of potassium hydroxide which is needed to neutralize the acids. Therefore, even though an acid group exists as a base in an actual system, it is assumed as a free acid. Specifically, the "acid value" is determined by the following equation (iii).

Acid value (mgKOH/g)=(Weight of acid contained in castor oil based compound/Molecular weight of acid contained in castor oil based compound)×Mole number of acid group contained in acid of 1 mol contained in castor oil based compound×Formula weight of potassium hydroxide×1000/Weight of castor oil based compound (iii):

In the present specification, the castor oil based compound preferably has a refractive index of 1.450 to 1.470 $N_D^{25}$. The refractive index generally means a value which is obtained by dividing a light speed in vacuum with a light speed in a material, and concretely means a value which is measured according to JIS K0062-1992. (Furthermore, the refractive index may mean an amount of "resistance" when light goes in a certain material.)

In the present specification, the castor oil based compound preferably has a melt viscosity of from 5 to 400 mPa·s at 25° C., particularly preferably has a melt viscosity of from 5 to 300 mPa·s at 25° C.

In the present specification, the melt viscosity at 25° C. means a value which is measured by a Brookfield viscometer with No. 27 rotor at a rotation number (or rotating speed) of 100.

When the castor oil based compound has a melt viscosity at 25° C. in the above mentioned range, the urethane adhesive of an embodiment of the present invention is excellent in compatibility, it would be difficult for bleed to generate, and the urethane adhesive is further excellent in applicability (or coatability).

Stabilizing Agent

A "stabilizing agent" in the present specification is blended so as to prevent decrease in molecular weight, occurrence of gelation, coloration, odor and the like of the urethane adhesive due to heat, thereby improving stability of the urethane adhesive, and there is no particular limitation as long as the objective urethane adhesive based on the present invention is obtainable. Examples of the "stabilizing agent" include antioxidants and light stabilizers. In the present specification, the light stabilizer mainly contains ultraviolet absorbers and hindered amine based stabilizing agents (HALS).

The "antioxidant" is used so as to prevent oxidative degradation of the urethane adhesive. Examples of the "antioxidant" include phenol based antioxidants, sulfur based antioxidants, phosphorus based antioxidants and the like.

The "ultraviolet absorber" is a compound which improves weatherability of the urethane adhesive by absorbing ultraviolet light and converting the energy of the ultraviolet light to kinetic energy and/or heat energy which are harmless to plastics. Examples of the ultraviolet absorber contain benzotriazole based ultraviolet absorbers, benzophenone based ultraviolet absorbers and the like.

The "hindered amine based stabilizing agents (HALS)" capture radicals produced by ultraviolet light and have effects that coloration is prohibited and gloss is maintained.

The above mentioned stabilizing agent is not particularly limited as long as the objective adhesive film mentioned below can be obtained and the stabilizing agent can be added to a urethane adhesive of an embodiment of the present invention.

It is possible to use commercially available products as the stabilizing agent. Examples thereof include Adekastab AO-50 and Adekastab LA-36 (trade name) produced by Adeka Corporation; SUMILIZER GM (trade name), SUMILIZER TPD (trade name) and SUMILIZER TPS (trade name) produced by Sumitomo Chemical Company Limited; IRGANOX 1010 (trade name), IRGANOX 1330 (trade name), IRGAFOS 168 (trade name), IRGANOX 1520 (trade name), Tinuvine 479 (trade name) and Tinuvne 123 (trade name) produced by BASF; and JP-650 (trade name) and JF77 (trade name) produced by Johoku Chemical Co., Ltd. These stabilizing agents can be used alone or in combination.

The urethane adhesive of an embodiment of the present invention may further comprise other components.

There is no particular limitation on the timing of the addition of the other components to the urethane adhesive as long as the objective urethane adhesive is obtainable.

Examples of the "other components" include a tackifier resin, a pigment, a flame retardant, a catalyst, a wax and the like.

Examples of the "tackifier resin" include styrene-based resins, terpene-based resins, aliphatic petroleum resins, aromatic petroleum resins, rosin esters, acrylic resins, polyester resins which are not polyesterpolyols and the like.

Examples of the "pigment" include titanium oxide, carbon black and the like.

Examples of the "flame retardant" include halogen-based flame retardants, phosphorous-based flame retardants, antimony-based flame retardants, metal hydroxide-based flame retardants and the like.

Examples of the "catalyst" include metal catalysts, for example, tin catalysts (trimethyltin laurate, trimethyltin hydroxide, dibutyltin dilaurate, dibutyltin maleate, etc.), lead-based catalysts (lead oleate, lead naphthenate, lead octenoate, etc.) and other metal catalysts (naphthenic acid metal salt such as cobalt naphthenate); amine-based catalyst such as triethylenediamine, tetramethylethylenediamine, tetramethylhexylenediamine, diazabicycloalkenes and dialkylaminoalkylamines;and the like.

The "wax" is preferably for example, a paraffin wax and a microcrystalline wax and the like.

The urethane adhesive of the embodiment of the present invention can be obtained by mixing the above mentioned urethane resin and the castor oil based compound, the stabilizer, and further optionally additional other components. The method for mixing the components is not particularly limited as long as the objective urethane adhesive can be obtained. The order of mixing the components and so on is not particularly limited. The urethane adhesive can be produced without any special mixing method, any special mixing order and the like, even though the urethane adhesive is a one-component (one liquid-type) adhesive or a two-component (or two liquid-type) adhesive. And the obtained urethane adhesive is excellent in compatibility, and excellent in releasability (removability, detachability or peel property) with regard to a glass plate and a polarizer. The releasability of the urethane adhesive does not decrease, even though it is retained under a severe condition of high temperature and high humidity.

The method for applying the urethane adhesive is not particularly limited as long as an objective adhesive film can be obtained. The application (or coating) can be performed by various methods such as gravure coating, wire bar coating, air knife coating, die coating, lip coating and comma coating methods.

The adhesive film of an embodiment of the present invention is coated with the above mentioned urethane adhesive, may be widely used for such as electronic components, woodworks (or wood products), building materials, and sanitary materials, and may be preferably used as a surface protective film for glass plates, polarizers and the like.

A member of an embodiment of the present invention is produced with the above mentioned adhesive film. Kinds of the member are not limited as long as they are produced with the above mentioned urethane adhesive. Examples of the member contain TVs, displays of such as mobile phones and tablets, windowpanes, glass for cars, furniture, diapers (or napkins), containers and the like.

EXAMPLES

The present invention will be described for the purpose of describing the present invention in more detail and specific manner by way of Examples. These are exemplary of the present invention and are not to be considered as limiting.

Raw materials for synthesizing urethane adhesives are shown below.

(A) Polyether polyol
(A1) polypropylene glycol (Primepol FF3320 (trade name) produced by Sanyo Chemical Industries, Ltd, Mn: 3,000, trifunctional, hydroxyl value: 56 mgKOH/g)
(A2) polypropylene glycol (Primepol PX1000 (trade name) produced by Sanyo Chemical Industries, Ltd, Mn: 1,000, difunctional, hydroxyl value: 112 mgKOH/g)
(A3) polytetramethylene ether glycol (Polytetramethylene ether glycol 850 (trade name) produced by Mitsubishi Chemical Corporation, Mn: 850, difunctional, hydroxyl value: 132 mgKOH/g)
(B) Polyester polyol
(B1) polyester polyol produced from 3-methyl-1,5-pentane diol/adipic acid (Kuraray Polyol P-1000 (trade name) produced by Kurarey Co., Ltd, Mn: 1000, difunctional, hydroxyl value: 112 mgKOH/g)
(B2) polyester polyol produced from adipic acid/hexane diol/neopentyl glycol (HS2F-231AS (trade name) produced by Hokoku Corporation, Mn: 2000, difunctional, hydroxyl value: 56 mgKOH/g)
(B3) polycarbonate polyol produced from 3-methyl-1,5-pentane diol/1,6-hexane diol (Kuraray Polyol C-1090 (trade name) produced by Kurarey Co., Ltd, Mn: 1000, difunctional, hydroxyl value: 112 mgKOH/g)
(C) Stabilizing agent
(C1) phenol based antioxidant (Adekastab AO-50 (trade name) produced by Adeka Corporation)
(C2) phenol based antioxidant (Irganox 1330 (trade name) produced by BASF)
(C3) phosphorus based antioxidant (JP-650 (trade name) produced by Johoku Chemical Co., Ltd)
(C4) hydroxyphenyltriazine based ultraviolet absorber (Tinuvine 479 (trade name) produced by BASF)
(C5) hindered amine based light stabilizer (Tinuvine 123 (trade name) produced by BASF)
(D) Isocyanate compound
(D1) aliphatic isocyanate (Isocyanulate of 1,6-diisocyanatohexane (HDI): Duranate 50M-HDI (trade name) produced by Asahi Kasei Chemicals Corporation)
(D2) alicyclic isocyanate (Isocyanulate of isophorone diisocyanate (IPDI): VESTANAT T1890/100 (trade name) produced by Sumika Bayer Urethane Co., Ltd)
(D3) aliphatic isocyanate (Xylilene diisocyanate (XDI): Takenate 500 (trade name) produced by Mitsui Chemicals Inc.)
(E) Plasticizer
(E1) fatty acid ester (IPM-R (trade name) produced by NOF Corporation, Acid value: 0.5 mgKOH/g or less, Refractive index: 1.434 $N_P^{25}$, Melt viscosity: 10 mPa·s (25° C.))
(E2) fatty acid ester (DINA (trade name) produced by J-Plus Co., Ltd, Acid value: 0.04 mgKOH/g or less, Refractive index: 1.449 $N_P^{25}$, Melt viscosity: 16 mPa·s (25° C.))
(E3) castor oil based diacid ester (Ric Cizer S-4 (trade name) produced by Itoh Oil Chemicals Co., Ltd, Acid value: 1.00 mgKOH/g or less, Refractive index: 1.442 $N_P^{25}$, Melt viscosity: 9 mPa·s (25° C.))
(E4) castor oil based fatty acid ester (Ric Cizer C-101 (trade name) produced by Itoh Oil Chemicals Co., Ltd, Acid value: 1.7 mgKOH/g or less, Refractive index: 1.454 $N_P^{25}$, Melt viscosity: 17 mPa·s (25° C.))
(E5) castor oil based fatty acid glycerin ester (Ric Cizer GR-301 (trade name) produced by Itoh Oil Chemicals Co., Ltd, Acid value: 2.0 mgKOH/g or less, Refractive index: 1.468 $N_P^{25}$, Melt viscosity: 215 mPa·s (25° C.))
(E6) hydrocarbon (Squalane (trade name) produced by Maruha Nichiro Corporation, Acid value: 0.5 mgKOH/g or less, Refractive index: 1.454 $N_P^{25}$, Melt viscosity: 305 mPa·s (25° C.))

Production of Urethane Adhesive

Above mentioned components (A) to (C) were mixed, the mixture was allowed to react with (D) an isocyanate compound to synthesize a urethane polyol. (E) a plasticizer was added to the urethane polyol and stirred to prepare a urethane polyol solution. Moreover, the above numeric value was based on solid content.

3 parts by weight of an adduct of the (D) isocyanate compound was added based on 100 parts by weight of the urethane polyol solution to synthesize a urethane prepolymer (urethane resin).

In the present specification, the urethane adhesive may comprise the above mentioned urethane resin, (C) the stabilizing agent and (E) the plasticizer. The urethane adhesive may be prepared more concretely as follows.

Example 1

77 parts by weight of the component (A1), 15.4 parts by weight of the component (B1) and 9.4 parts by weight of the component (C1) were charged into a separable flask, stirred and dehydrated at a temperature of 110° C. for 120 minutes in vacuo. 7.2 parts by weight of the (D1) was charged into the flask, and the temperature of the mixture in the flask was maintained at a temperature of 110° C. for 5 hours for each component to be allowed to react to prepared a urethane polyol.

33.3 parts by weight of the (E3) was added to 100 parts by weight of the obtained urethane polyol, stirred and solved at a normal temperature to prepare a urethane polyol solution.

100 parts by weight of the urethane polyol solution was blended with 3 parts by weight of a 75 wt % solution of (D4) a methylolpropane adduct of hexamethylene diisocyanate in ethyl acetate (Duranate P301-75 (trade name) produced by Asahi Kasei Chemicals Corporation) to synthesize a urethane prepolymer (a urethane resin).

A urethane adhesive of Example 1 comprising the urethane prepolymer (urethane resin), the (C1) and the (E3) was obtained.

TABLE 1

| Example | | 1 | 2 | 3 | 4 | 5 | 6 | 7 |
|---|---|---|---|---|---|---|---|---|
| (A) | (A1) | 77 | 77 | 77 | 77 | 77 | 77 | 70.8 |
|  | (A2) |  | 15.4 | 15.4 | 15.4 |  |  |  |
|  | (A3) |  |  |  |  |  | 15.4 |  |
| (B) | (B1) | 15.4 |  |  |  | 11.5 |  | 21.2 |
|  | (B2) |  |  |  |  | 3.9 |  |  |
|  | (B3) |  |  |  |  |  |  |  |
| (C) | (C1) | 0.4 | 0.4 | 0.4 | 0.4 | 0.4 | 0.4 | 0.4 |
|  | (C2) |  |  |  |  |  |  |  |
|  | (C3) |  |  |  |  |  |  |  |
|  | (C4) |  |  |  |  |  |  |  |
|  | (C5) |  |  |  |  |  |  |  |
| (D) | (D1) | 7.2 | 7.2 | 7.2 | 7.2 | 7.2 | 7.2 | 7.6 |
|  | (D2) |  |  |  |  |  |  |  |
|  | (D3) |  |  |  |  |  |  |  |
|  |  |  | 100 | 100 | 100 | 100 | 100 | 100 |

TABLE 1-continued

| Example | | 1 | 2 | 3 | 4 | 5 | 6 | 7 |
|---|---|---|---|---|---|---|---|---|
| (E) | (E1) | | | | | | | |
| | (E2) | | | | | | | |
| | (E3) | 33.3 | 33.3 | | | 33.3 | 33.3 | 33.3 |
| | (E4) | | | 33.3 | | | | |
| | (E5) | | | | 33.3 | | | |
| | (E6) | | | | | | | |
| total (pbw) | | 133.3 | 133.3 | 133.3 | 133.3 | 133.3 | 133.3 | 133.3 |
| Compatibility | | A | A | B | B | B | A | A |
| Releasability 23° C. | | 2 | 2 | 2 | 2 | 3 | 3 | 2 |

TABLE 1-continued

| Example | | | 1 | 2 | 3 | 4 | 5 | 6 | 7 |
|---|---|---|---|---|---|---|---|---|---|
| Temperature (g/25 mm) | 28 days | | AF | AF | AF | AF | AF | AF | AF |
| | | | A | A | A | A | A | A | A |
| Releasability Heat-resistance (g/25 mm) | 150° C. 24 hours | | 378 | 450 | 750 | 503 | 780 | 450 | 790 |
| | | | AF | AF | AF | AF | AF | AF | AF |
| | | | B | B | B | B | B | B | B |
| Releasability Humidity & heat-resistance (g/25 mm) | 85° C. 85% 21 days | | 10 | 10 | 11 | 12 | 13 | 11 | 12 |
| | | | AF | AF | AF | AF | AF | AF | AF |
| | | | A | A | A | A | A | A | A |

TABLE 2

| Example | | 8 | 9 | 10 | 11 | 12 | 13 | 14 | 15 |
|---|---|---|---|---|---|---|---|---|---|
| (A) | (A1) | 77 | 93.3 | 77 | 76.3 | 77 | 77 | 77 | 77 |
| | (A2) | | | | | | | | |
| | (A3) | | | | | | | | |
| (B) | (B1) | 11.6 | | 15.4 | 15.3 | 15.4 | 15.4 | 15.4 | 15.4 |
| | (B2) | | | | | | | | |
| | (B3) | 3.8 | | | | | | | |
| (C) | (C1) | 0.4 | 0.4 | 0.4 | 0.4 | | 0.4 | 0.4 | 0.4 |
| | (C2) | | | | | 0.4 | | | |
| | (C3) | | | | | | 0.1 | | |
| | (C4) | | | | | | | 0.1 | |
| | (C5) | | | | | | | | 0.1 |
| (D) | (D1) | 7.2 | 6.3 | | | 7.2 | 7.2 | 7.2 | 7.2 |
| | (D2) | | | 7.2 | | | | | |
| | (D3) | | | | 8 | | | | |
| | | 100 | 100 | 100 | 100 | 100 | 100 | 100 | 100 |
| (E) | (E1) | | | | | | | | |
| | (E2) | | | | | | | | |
| | (E3) | 33.3 | 40 | 33.3 | 33.3 | 33.3 | 33.3 | 33.3 | 33.3 |
| | (E4) | | | | | | | | |
| | (E5) | | | | | | | | |
| | (E6) | | | | | | | | |
| total (pbw) | | 133.3 | 140 | 133.3 | 133.3 | 133.3 | 133.4 | 133.4 | 133.4 |
| Compatibility | | A | A | A | A | A | A | A | A |
| Releasability 23° C. | | 3 | 2 | 2 | 2 | 2 | 2 | 2 | 2 |
| Temperature (g/25 mm) | 28 days | AF | AF | AF | AF | AF | AF | AF | AF |
| | | A | A | A | A | A | A | A | A |
| Releasability Heat-resistance (g/25 mm) | 150° C. 24 hours | 720 | 450 | 390 | 520 | 300 | 450 | 450 | 450 |
| | | AF | AF | AF | AF | AF | AF | AF | AF |
| | | B | B | B | B | B | B | B | B |
| Releasability Humidity & heat-resistance (g/25 mm) | 85° C. 85% 21 days | 13 | 10 | 10 | 10 | 9 | 10 | 10 | 10 |
| | | AF | AF | AF | AF | AF | AF | AF | AF |
| | | A | A | A | A | A | A | A | A |

TABLE 3

| Comparative Example | | 1 | 2 | 3 | 4 | 5 | 6 | 7 |
|---|---|---|---|---|---|---|---|---|
| (A) | (A1) | 70.8 | 77 | 77 | 77 | | 93.3 | 77.3 |
| | (A2) | | 15.4 | 15.4 | 15.4 | | | |
| | (A3) | | | | | | | |
| (B) | (B1) | 21.2 | | | | 93.3 | | 15.5 |
| | (B2) | | | | | | | |
| | (B3) | | | | | | | |
| (C) | (C1) | 0.4 | 0.4 | 0.4 | 0.4 | 0.4 | 0.4 | |
| | (C2) | | | | | | | |
| | (C3) | | | | | | | |
| | (C4) | | | | | | | |
| | (C5) | | | | | | | |
| (D) | (D1) | 7.6 | 7.2 | 7.2 | 7.2 | 6.3 | 6.3 | 7.2 |
| | (D2) | | | | | | | |
| | (D3) | | | | | | | |
| | | 100 | 100 | 100 | 100 | 100 | 100 | 100 |

TABLE 3-continued

| Comparative Example | | 1 | 2 | 3 | 4 | 5 | 6 | 7 |
|---|---|---|---|---|---|---|---|---|
| (E) | (E1) | 33.3 | 33.3 | | | | | |
|  | (E2) | | | 33.3 | | | | |
|  | (E3) | | | | | 33.3 | | 33.3 |
|  | (E4) | | | | | | | |
|  | (E5) | | | | | | | |
|  | (E6) | | | | 33.3 | | | |
| total (pbw) | | 133.3 | 133.3 | 133.3 | 133.3 | 133.3 | 100 | 133.3 |
| Compatibility | | C | C | C | D | A | A | A |
| Releasability | 23° C. | 30 | 5 | 2 | 2 | 2 | 300 | 5 |
| Temperature | 28 days | AF | AF | CF | CF | AF | CF | AF |
| (g/25 mm) | | B | B | D | D | A | D | B |
| Releasability | 150° C. | 0 | 1 | 1 | 1 | 1 | 12 | 1 |
| Heat-resistance | 24 hours | CF | CF | CF | CF | CF | CF | CF |
| (g/25 mm) | | D | D | D | D | D | D | D |
| Releasability | 85° C. | 57 | 60 | 80 | 1 | 2 | 2 | 1 |
| Humidity & | 85% | AF/CF | AF/CF | CF | CF | CF | CF | CF |
| heat-resistance | 21 days | C | C | D | D | D | D | D |
| (g/25 mm) | | | | | | | | |

Example 2-Comparative Example 7

Urethane adhesives are prepared by blending the components (A)-(E) according to the compositions indicated on the Tables 1-3. The concrete preparation methods are similar with that of the Example 1.

Preparation of Self-Adhesive Sheet for Evaluations

Each of the urethane adhesives of Examples 1-15 and Comparative examples 1-7 was applied to a non-release (type) polyethylene terephthalate (PET) film in thickness of 10 μm. After the application, the adhesive was dried at 80° C. for 5 minutes, and a release (type) PET film was placed on a surface of the urethane adhesive layer to prepare each of self-adhesive sheets for evaluations.

Evaluation Tests

Following evaluation tests were carried out using the above mentioned self-adhesive sheets for evaluations.

1. Compatibility

The urethane polyol solutions prepared in the Examples and Comparative examples were stored at 23° C. for 24 hours. White turbidity of the solutions was visually observed. Evaluation criteria are as follows.

A: unclouded and transparent
B: a little cloudy but transparent
C: translucent
D: white cloudy 2. Releasabilty (or Removability) with Regard to Glass (at Normal Temperature)

A test sheet (25 mm×70 mm) was cut out of the above mentioned adhesive sheet. The release (type) PET film was removed from the cut out test sheet. The non-release (type) PET film was arranged on a glass plate as an adherend so that the Urethane adhesive layer contacted the glass plate, and then a load of 2 Kg was applied with a roller in one stroke to prepare a laminate in which the non-release PET film was attached to the glass plate through the urethane adhesive.

The laminate of the non-release PET film with the glass plate was stored under an atmosphere at a temperature of 23° C. and at a humidity of 50% for 28 days. And then, under an atmosphere at a temperature of 23° C. and at a humidity of 50%, peel strength of the laminate was measured with a tensile testing machine (produced by Shimadzu Corporation) by pulling the non-release PET film in a direction of 180° at a tension rate of 300 mm/min.

Evaluation criteria are as follows.

A: Interfacial failure (AF: adhesive failure) resulted and peel strength was less than 4 g/25 mm.
B: Interfacial failure (AF: adhesive failure) resulted and peel strength was 4 g/25 mm or more.
C: Interfacial failure and Cohesive Failure (AF/CF) resulted.
D: Cohesive failure (CF) resulted.

In the present specification, "Interfacial failure (AF: adhesive failure)" means that release generated at the interface between the glass plate and the adhesive. Therefore, there was no adhesive deposit on the glass plate. On the other hand, "cohesive failure (CF)" means that the failure generated inside of the adhesive. Therefore, the adhesive at least partly remained on the glass plate. That is, CF means that there was an adhesive deposit. Moreover, since the non-release PET film was used, no release at the interface between the adhesive and the PET film was observed.

3. Releasability (or Removability) with Regard to Glass (Heat Resistivity)

A laminate of a non-release (type) PET film with a glass plate, which was obtained by a similar manner with that mentioned in the above releasability with regard to glass (at normal temperature) section was stored under an atmosphere at a temperature of 150° C. for 24 hours. And then, the laminate was further stored under an atmosphere at a temperature of 23° C. and at a humidity of 50% for 24 hours. Under an atmosphere at a temperature of 23° C. and at a humidity of 50%, peel strength of the laminate was measured with a tensile testing machine (produced by Shimadzu Corporation) by pulling the non-release PET film in a direction of 180° at a tension rate of 300 mm/min.

Evaluation criteria are as follows.

A: Interfacial failure (AF: adhesive failure) resulted and peel strength was less than 100 g/25 mm.
B: Interfacial failure (AF: adhesive failure) resulted and peel strength was 100 g/25 mm or more.
C: Interfacial failure and Cohesive Failure (AF/CF) resulted.
D: Cohesive Failure (CF) resulted.

4. Releasabilty (or Removability) with Regard to Glass (Humidity and Heat Resistivity)

A laminate of a non-release (type) PET film with a glass plate which was obtained by a similar manner with that mentioned in the above releasability with regard to glass (at normal temperature) section was stored under an atmosphere at a temperature of 85° C. and at a humidity of 85% for 21 days. And then, the laminate was further stored under an atmosphere at a temperature of 23° C. and at a humidity of 50% for 24 hours. Under an atmosphere at a temperature of 23° C. and at a humidity of 50%, peel strength of the laminate was measured with a tensile testing machine (produced by Shimadzu Corporation) by pulling the non-release type PET film in a direction of 180° at a tension rate of 300 mm/min.

Evaluation criteria are as follows.

A: Interfacial failure (AF: adhesive failure) resulted and peel strength was less than 15 g/25 mm.

B: Interfacial failure (AF: adhesive failure) resulted and peel strength was 15 g/25 mm or more.

C: Interfacial failure and Cohesive Failure (AF/CF) resulted.

D: Cohesive Failure (CF) resulted.

As indicated in Tables 1 and 2, since the urethane adhesives of Examples 1-15 comprise a urethane resin synthesized from a polyether polyol and an isocyanate compound, and further comprise a castor oil based compound and a stabilizing agent, they are preferable in all of evaluation items.

On the other hand, with regard to the urethane adhesives of Comparative Examples, "D" is indicated on at least one of the evaluation items. Since the urethane adhesives of Comparative Examples 1-4 and 6 comprise no castor oil based compound, they are inferior in releasability. Particularly, the urethane adhesives of Comparative Examples 1-4 have not only reduced releasability but also inferior compatibility.

The urethane adhesive of Comparative Example 5 has reduced releasability, since the urethane resin was prepared without a polyether polyol. Since the urethane adhesive of Comparative Example 7 comprises no stabilizing agent, it is inferior in releasability under a heat resistance condition and inferior in releasability under a heat and humidity resistance condition.

According to the above results, it is confirmed that releasability of urethane adhesives comprising a urethane resin synthesized from a polyether polyol and an isocyanate compound; a castor oil based compound; and a stabilizing agent does not decrease and the adhesives are excellent in compatibility, even though they are kept under a severe condition such as at high temperature and at a high humidity.

INDUSTRIAL APPLICABILITY

The present invention provides urethane adhesives. The urethane adhesives of an embodiment of the present invention are preferably applied to surface protective films which are attached (or bonded) to displays of such as mobile phones and TVs, and windowpanes and the like.

The invention claimed is:

1. A urethane pressure sensitive adhesive comprising a urethane resin obtained by blending a polyol component, an isocyanate compound, a plasticizer; and a stabilizing agent, wherein the polyol component comprises a polyether polyol and the plasticizer comprises a castor oil based compound having an acid value of not more than 3.0 mgKOH/g;
wherein the polyol component does not contain a polyester polyol.

2. The urethane adhesive according to claim 1, wherein the isocyanate compound is hexamethylene diisocyanate (HDI), an adduct of trimethylolpropane and hexamethylene diisocyanate or a combination thereof.

3. The urethane adhesive according to claim 1, further comprising one or more other components selected from the group consisting of tackifier resin, pigment, flame retardant, catalyst and wax.

4. The urethane adhesive according to claim 1, wherein the isocyanate compound is selected from the group consisting of aliphatic isocyanates and alicyclic isocyanates.

5. The pressure sensitive adhesive of claim 1 wherein the polyether polyol has a molecular weight of 1,000 to 5,000.

6. A pressure sensitive urethane adhesive comprising a urethane resin obtained by blending a polyol component, an isocyanate compound, a plasticizer; and a stabilizing agent, wherein the polyol component comprises a polyether polyol and the plasticizer comprises a castor oil based compound, wherein the castor oil based compound has a viscosity of from 5 to 400 mPa·s at 25° C.;
wherein the polyol component does not contain a polyester polyol.

7. A pressure sensitive urethane adhesive comprising a urethane resin obtained by blending a polyol component, an isocyanate compound, a plasticizer; and a stabilizing agent, wherein the polyol component comprises a polyether polyol and the plasticizer comprises a castor oil based compound;
wherein the polyol component does not contain a polyester polyol; and wherein the polyol component comprises a hydroxyl functional urethane polyol that is a reaction product of a mixture comprising the polyether polyol and an isocyanate compound.

8. A removable self-adhesive film coated with a pressure sensitive urethane adhesive obtained by blending a polyol component, an isocyanate compound, a plasticizer; and a stabilizing agent, wherein the polyol component comprises a polyether polyol and the plasticizer comprises a castor oil based compound;
wherein the polyol component does not contain a polyester polyol.

9. A substrate comprising the removable self-adhesive film coated with the pressure sensitive urethane adhesive according to claim 8.

* * * * *